United States Patent [19]

Matsuyama

[11] 4,390,915
[45] Jun. 28, 1983

[54] HELICAL SCAN TYPE VIDEO TAPE RECORDER

[75] Inventor: Atsuo Matsuyama, Atsugi, Japan

[73] Assignee: Sony Corporation, Tokyo, Japan

[21] Appl. No.: 214,863

[22] Filed: Dec. 9, 1980

[30] Foreign Application Priority Data

Dec. 11, 1979 [JP] Japan ................................ 54-160505

[51] Int. Cl.³ .......................... G11B 5/52; G11B 5/28; G11B 27/02
[52] U.S. Cl. ...................................... 360/104; 360/13; 360/66; 360/84; 360/121
[58] Field of Search ................. 360/104, 84, 121, 119, 360/122-123, 109, 105, 13-14, 70, 77, 66, 64

[56] References Cited

U.S. PATENT DOCUMENTS

| | | | |
|---|---|---|---|
| 3,157,739 | 11/1964 | Okamura | 360/64 |
| 3,342,949 | 9/1967 | Wessels | 360/66 |
| 3,549,822 | 12/1970 | Chupity | 360/121 |
| 4,005,481 | 1/1977 | Lackner | 360/66 |
| 4,163,262 | 7/1979 | Kaemmerer | 360/84 |
| 4,293,880 | 10/1981 | Tsukada et al. | 360/64 |
| 4,306,261 | 12/1981 | Bergmans et al. | 360/109 |
| 4,318,146 | 3/1982 | Ike et al. | 360/119 |

*Primary Examiner*—Alfred H. Eddleman
*Attorney, Agent, or Firm*—Lewis H. Eslinger; Alvin Sinderbrand

[57] ABSTRACT

In a two-head helical scan video tape recorder, a pair of rotary erase heads are provided, and in order to avoid undesirable erasure by fringe flux, each rotary erase head integrally formed with one of two video recording heads and is positioned on a rotary member so that the scanning position thereof is always displaced from the scanning position of the associated video recording head by at least one video track interval in the scanning direction of the heads, in case of guardbandless azimuth recording.

15 Claims, 18 Drawing Figures

FIG. 5
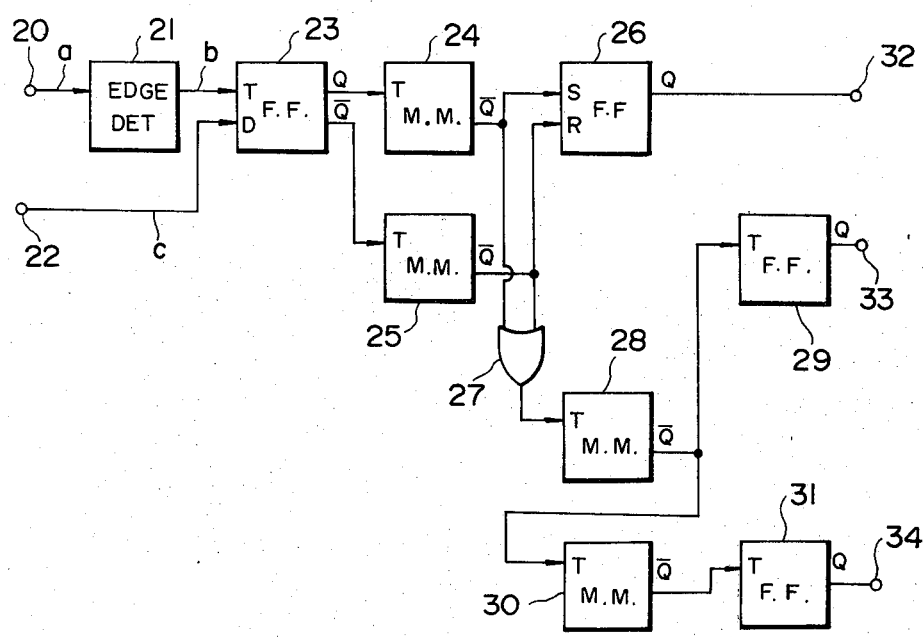
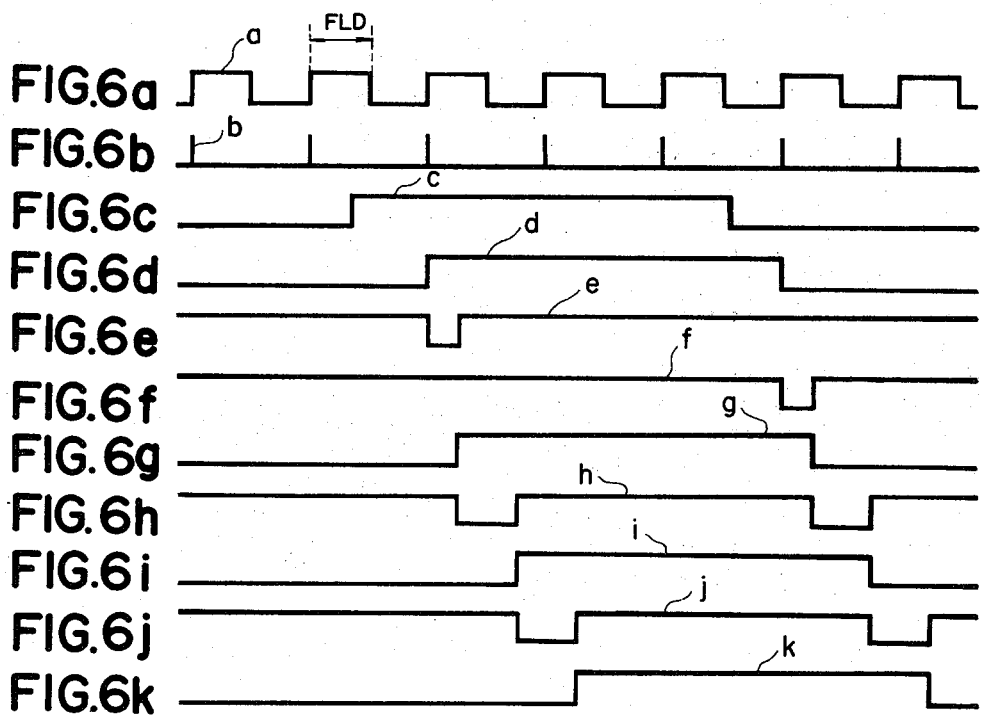

HELICAL SCAN TYPE VIDEO TAPE RECORDER

BACKGROUND OF THE INVENTION

1. Field of the Invention

This invention relates to video tape recorders of the helical scan type and, more particularly, is directed to video tape recorders of the helical scan type adapted to perform an editing operation.

2. Description of the Prior Art

A known prior art two-head helical scan video tape recorder used for editing, includes two sets of heads, each set consisting of an erase head and a video head, so that the heads of each set scan the same track of a magnetic tape in such a manner that the video signal already recorded in the track is erased by the erase head before the incoming video signal is recorded by the video head. With such a video tape recorder, the erase head and the video head of the same set are mounted on a rotary member at positions comparatively spaced apart so that they scan the same magnetic track in succession. However when the leading erase head commences or ends its contact with the magnetic tape, an impact is imparted to the magnetic tape, and this impact or force is likely to cause a time axis or "impact" error.

Further, in the conventional video tape recorder used for editing, it is usual that the effective track width of the erase head is slightly greater than that of the video head. Therefore, when such erase head and video head are used with a guardbandless azimuth recording system, it is likely that the erase head having a greater effective track width erases data recorded in adjacent tracks.

OBJECT AND SUMMARY OF THE INVENTION

Accordingly, it is an object of the present invention to provide a novel video tape recorder of the helical scan type that avoids the above-described difficulties encountered with the prior art.

It is another object of the present invention to provide a novel video tape recorder having an editing function.

It is a further object of the present invention to provide a novel helical scan video tape recorder having rotary or flying erase heads.

It is still another object of the present invention to provide a novel head assembly for a video tape recorder of the helical scan type which substantially eliminates impact errors that occur during commencement or at the end of contact of the heads with the magnetic tape.

It is yet another object of the present invention to provide a novel head assembly for a video type recorder of the helical scan type which substantially prevents erasure of data recorded in the tracks by a video recording head from leakage flux in the lateral direction of the tracks.

It is a still further object of the present invention to provide a novel head assembly for a video tape recorder of the helical scan type which is economical to construct and to mount with accuracy.

In a video tape recording (hereinafter referred to as VTR) according to the present invention, flying erase heads are each provided in the neighborhood of each of a pair of rotary video heads. The individual video heads have different azimuth angles, and the recording density is improved by the so-called azimuth recording techniques.

Each flying erase head is positioned to have a gap height such that when the associated video head is recording, the flying erase head erases the preceding track.

Preferably, the effective track width of the flying erase head is made the same as or smaller than that of the rotary video head. The selection of the effective widths is very important with the VTR using a guardbandless azimuth recording.

In accordance with an aspect of this invention, in a helical scan type video tape recording apparatus of the type adapted to perform an editing operation and having a rotary body, a first magnetic head assembly comprises a first video head secured to the rotary body for recording video signals on a video tape in a plurality of parallel tracks extending obliquely on the tape; and a first erase head secured to the rotary body for erasing video signals recorded in the video tracks, the erase head being positioned to scan the video tracks so that the scanning position of the erase head is always displaced from the scanning position of the video head by at least one video track interval in the scanning direction of the heads.

The above and other, objects, features and advantages of the invention will become apparent from the following detailed description of illustrative embodiments of the invention which is to be read in connection with the accompanying drawings.

BRIEF DESCRIPTION OF THE DRAWINGS

FIG. 5 is a block diagram of one embodiment of a magnetic tape editing circuit for controlling the operation of the head assemblies in FIG. 1;

FIGS. 6a to 6k, inclusive, are wave form diagrams used for explaining the operation of the circuit of FIG. 5;

DETAILED DESCRIPTION OF THE PREFERRED EMBODIMENTS

Figure 1:
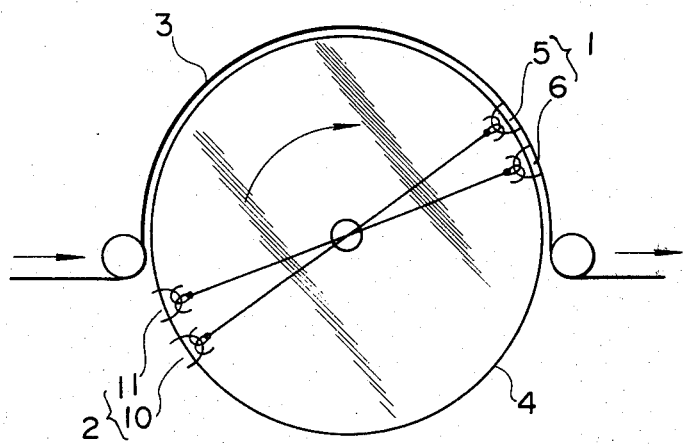
FIG. 1 is a schematic plan view showing the relation between a rotary having two head assemblies and a magnetic tape.

Referring to the drawings in detail, and initially to FIG. 1 thereof, there is schematically shown the relation between a rotary member carrying a magnetic head assembly and a magnetic tape helically wrapped about the rotary member. More particularly, a composite magnetic head assembly 1 used for a first channel A (hereinafter referred to as the A head assembly) and another composite magnetic head assembly 2 for channel B (hereinafter referred to as the B head assembly) are provided on a rotary member (commonly termed rotary drum) 4, about which a magnetic tape 3 is helically wrapped over a predetermined wrap angle. The head assemblies 1 and 2 are spaced apart by about 180 positional degrees in the direction of rotation of rotary member 4. The A and B head assemblies 1 and 2 have practically the same construction, so that the construction of only the A head assemblies will be described hereinafter.

Figure 2:
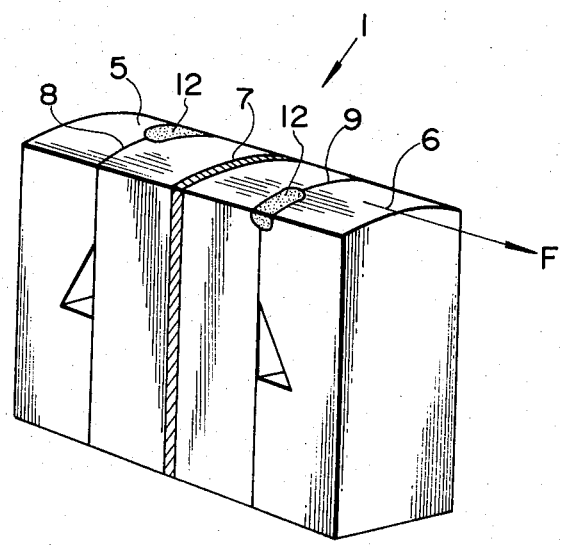
FIG. 2 is a perspective view showing a magnetic head assembly according to the present invention.
Figure 3:
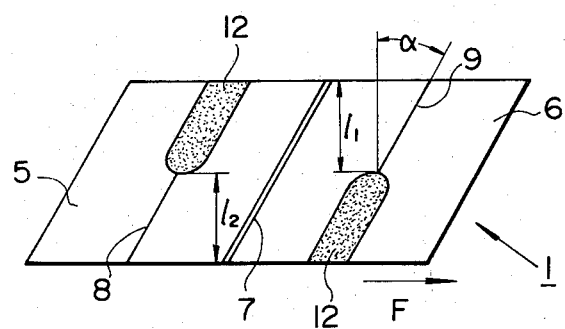
FIG. 3 is a top plan view showing the magnetic head assembly of FIG. 2.
Figure 4:
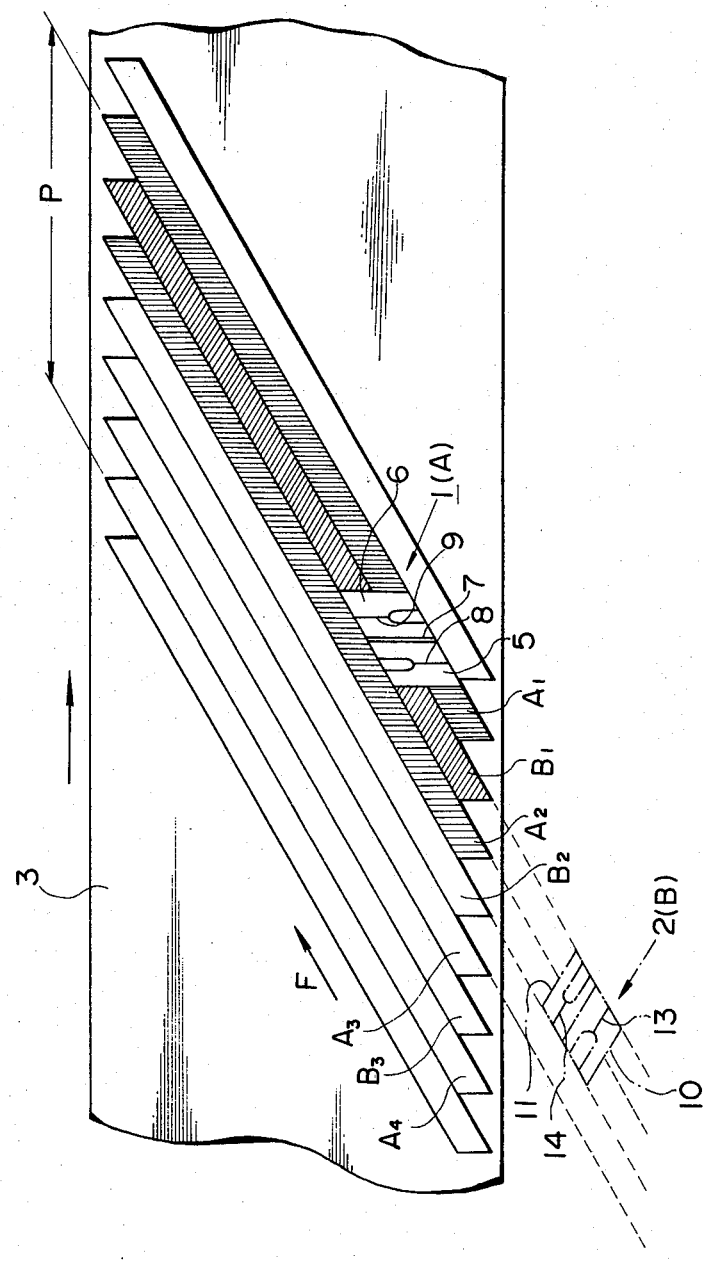
FIG. 4 is a schematic view showing the scanning of magnetic tape by the magnetic head assemblies in FIG. 1.

As shown in FIG. 2, the A head assembly 1 includes a recording/playback head (hereinafter referred to as the R/P head) 5 and a flying erase magnetic head (hereinafter referred to as the FE head) 6, these heads being bonded together by a non-magnetic material 7 such as glass. In the R/P head 5 and FE head 6, respective parallel gaps 8 and 9 having a predetermined azimuth angle $\alpha$ are formed, as shown in FIG. 3. As shown in FIG. 4, the A and B head assemblies 1 and 2 are adapted to scan the magnetic tape 3 (in the direction of arrow F in FIG. 4) such that successive A channel recording tracks (hereinafter referred to as tracks $A_1, A_2, \ldots$) and B channel recording tracks (hereinafter referred to as tracks $B_1, B_2, \ldots$) are formed by gaps 8 and 13 of these heads. At this time, the effective track width $l_1$ in the track scanning direction F formed by the preceding FE head 6, as shown in FIG. 3, is the same as or smaller than the effective track width $l_2$ in the track scanning direction F formed by the R/P head 5.

Figure 7:
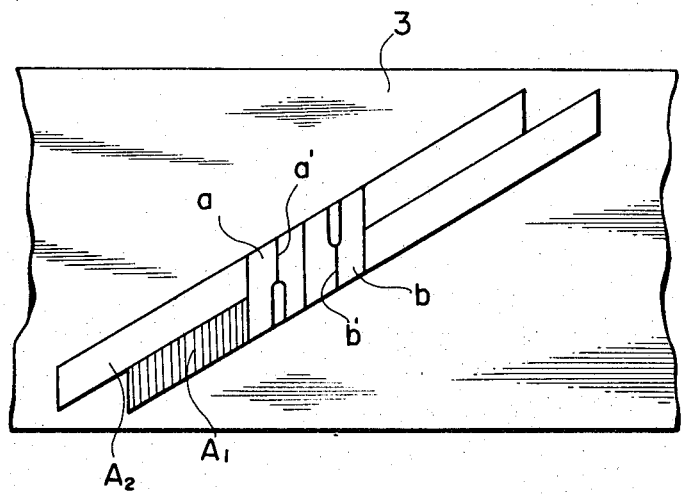
FIG. 7 is a schematic view showing the scanning of magnetic tape by a magnetic head assembly where the erase head is positioned behind the video head.

The position of gap 9 formed in FE head 6, as shown in FIG. 4, is leading with respect to the position of gap 8 formed in R/P head 5 in the track scanning direction. This arrangement is preferred, since otherwise, with an arrangement as shown in FIG. 7, in which the gap $a'$ of FE head a and the gap $b'$ of R/P head b are formed such that the former trails the latter in the track scanning direction, data recorded in recording track $A_1$ by R/P head b, and particularly those portions of data recorded at edge portions of recording track $A_1$, are liable to be erased by lateral leakage flux produced from gap $a'$ of FE head a. Thus, with the aforementioned arrangement, gap 9 of FE head 6 leads gap 8 of R/P head 5 so that recording by R/P head 5 is accomplished after the erasure of previous data by FE head 6. In other words, it is only the previously recorded data which is to be re-written by R/P head 6, that is erased and the erasure at this time produces no problems with the magnetic recording.

The B head assembly 2 has the same construction as the A head assembly 1, as above, except that the azimuth angle of the gaps 13 and 14 formed in the respective R/P and FE heads 10 and 11 is different from the aforementioned azimuth angle $\alpha$ of gaps 8 and 9 in head assembly 1. Reference numeral 12 designates a non-magnetic material.

The A and B head assemblies 1 and 2 scan the magnetic tape 3 along magnetic tracks in the following manner.

R/P head 5 of the A head assembly 1 scans the magnetic tape 3 along the A track $A_1$, while FE head 6 scans along the B track $B_1$. After a predetermined period of time, that is, after one-half rotation of rotary member 4, R/P head assembly 10 of head 2, shown by imaginary lines in FIG. 4, scans along the same B track $B_1$ previously scanned by FE head 6, and FE head 11 scans along the A track $A_2$. After a further one-half rotation of rotary member 4, R/P head 5 of A head assembly 1 scans along the A track $A_2$, while FE head 6 scans along the B track $B_2$.

In the above manner, the A and B head assemblies 1 and 2 scan along the successive recording tracks $A_1, A_2, \ldots$ and $B_1, B_2, \ldots$. More particularly, the A head assembly 1 effects recording in successive tracks $A_1, A_2, \ldots$ with R/P head 5 while erasing B tracks with FE head 6, and the B head assembly 2 effects recording in successive tracks $B_1, B_2, \ldots$ with R/P head 10 while erasing A tracks with FE head 11.

Magnetic head assemblies are typically fabricated by bonding together a plurality of magnetic plates and cutting the resultant laminate construction to a predetermined length. With this construction, the junctures of the magnetic plates are partly used as gaps. The A and B head assemblies 1 and 2 according to the present invention can be readily produced by the aforementioned method. However, with the magnetic head assemblies according to the present invention, gaps 9 and 14 respectively formed in FE heads 6 and 11 of the A and B head assemblies 1 and 2 must be parallel to the respective gaps 8 and 13 formed in R/P heads 5 and 10. By the aforementioned method, the A head assembly 1, for example, can be produced by bonding together R/P head 5 and FE head 6 by a non-magnetic material 7, whereby it is possible to obtain a very high degree of parallelism between gaps 8 and 9.

The case of effecting predetermined video tape editing by using the A and B head assemblies 1 and 2 according to the present invention will now be described with reference to FIG. 4, which is a schematic showing of the magnetic tape, FIG. 5 which shows a circuit construction for obtaining gate signals required for inserting given frames of video signals, and FIGS. 6a and 6k, which show time charts used for explaining the operation of the circuit construction of FIG. 5.

As an example of a video tape editing operation, the insertion of three frames of a new video signal (P in FIG. 4) on a recorded magnetic tape will now be discussed. For controlling the operation of FE heads 6 and 11 and R/P heads 5 and 10, several gate signals are required to effect the editing of the aforementioned three frames (P in FIG. 4).

To obtain these gate signals, an RF switching pulse a (FIG. 6a), which is produced from a sync separator circuit or the like in response to a predetermined video signal and having a pulse duration FLD corresponding to one field, is supplied to a first input terminal 20, as shown in FIG. 5. This pulse signal a is coupled to a pulse edge detecting circuit 21 which produces a pulse signal b (FIG. 6b), which corresponds to the rising edges of the RF switching pulse a.

In addition, a command signal c (FIG. 6c) having a predetermined duration corresponding to three video frames is supplied to a second input terminal 22. This command signal C is coupled to a data terminal D of a D-flip flop 23, while a trigger terminal T thereof is supplied with the pulse signal b from detecting circuit 21. The D-flip flop 23 functions to synchronize the rising and falling edges of the command signal C with the pulse signal b. Accordingly, D-flip flop 23 supplies a synchronized command signal d (FIG. 6d) at its Q output. The Q and $\overline{Q}$ outputs of D-flip flop 23 are supplied to trigger terminals of monostable multi-vibrator circuits 24 and 25, respectively. These multi-vibrator circuits 24 and 25 are provided for delaying the positive going edges of the Q and $\overline{Q}$ outputs from flip flop 23 for approximately one half of a video field interval. From these multi-vibrator circuits 24 and 25, $\overline{Q}$ outputs (FIG. 6e and FIG. 6f) are derived, and supplied to the set and the reset inputs of a flip flop 26, respectively, to inputs of an OR gate 27. These $\overline{Q}$ outputs are supplied through OR gate 27 to a monostable multi-vibrator circuit 28 having a time constant corresponding to one video field interval and which is triggered at the positive going edges of pulses e (FIG. 6e) and f (FIG. 6f). Flip-flop 28 therefore generates a delayed pulse h (FIG. 6h) at its $\overline{Q}$ output. The positive going edges of the delayed pulse h triggers another monostable multi-vibrator circuit 30 which also has a time constant corresponding to one video field interval and the $\overline{Q}$ output of multi-vibrator circuit 30, in turn, supplies a delayed pulse j (FIG. 6j) to a flip flop 31. The aforementioned delayed pulse h also triggers a flip flop 29. Accordingly, flip flop 26 supplies a first control pulse g (FIG. 6g) to an output terminal 32, flip flop 29 supplies a second control pulse i (FIG. 6i) to an output terminal 33 and flip flop 31 supplies a third control pulse k (FIG. 6k) to an output terminal 34, respectively.

When the RF switch pulse a is high, the B head assembly 2 is in contact relation with video tape 3, and first control pulse g is applied to control the erase current for FE head 6. Further, the second control pulse i is applied to control the erase current for FE head 11, and also to control the recording current for R/P head 10, while the third control pulse k is applied to control the recording current for R/P head 5.

As described above, according to the present invention, the A and B head assemblies 1 and 2, which are secured on rotary member 4, each have an integral structure including R/P head 5 or 10 and FE head 6 or 11, respectively so that it is possible to obtain high precision of the direction of the gap 8 or 13 formed in R/P head 5 or 10 and gap 9 or 14 formed in head 6 or 11, respectively. This also provides for a reduction of time required for mounting the A and B head assemblies 1 and 2 and an improvement in mounting precision compared to prior art structures formed by producing individual heads separately and independently mounting them on a rotary member (or rotary drum).

Also, since in the individual A and B head assemblies 1 and 2, the R/P heads 5 and 10 are respectively integral with the associated FE heads 6 and 11, unlike the prior art head assemblies where the video head and erase head are mounted on a rotary drum at positions spaced apart by a predetermined distance, it is possible to eliminate impact errors that result with prior art structures at the time of commencement or at the end of contact of the video head and erase head with the magnetic tape.

Further, since according to the present invention the FE heads 6 and 11 are disposed in the proximity of the associated R/P heads 5 and 10 such that the erasing operation of the FE head 6 and 11 for respective video tracks $A_1, A_2, \ldots$ and $B_1, B_2, \ldots$ precedes the recording operation of the associated R/P heads 5 and 10 by one track, the video tracks $B_1, B_2, \ldots$ are traced, after the erasure of the recorded content therein by FE head 6 of the A head assembly 1, by the R/P head 10 of the B head assembly 2 for recording new signals in these tracks $B_1, B_2 \ldots$.

Furthermore, since according to the present invention the gaps 9 and 14 of the FE heads 6 and 11 precede the respective gaps 8 and 13 of the R/P heads 5 and 10 in the track scanning direction, that is, the direction of arrow F in FIG. 4, there is no possibility that the data recorded by the R/P heads 5 and 10 in the video tracks $A_1, A_2, \ldots$ and $B_1, B_2, \ldots$ will be even partly erased by leakage flux produced from the FE heads 6 and 11 in the lateral directions of the video tracks $A_1, A_2, \ldots$ and $B_1, B_2, \ldots$.

Figure 8:
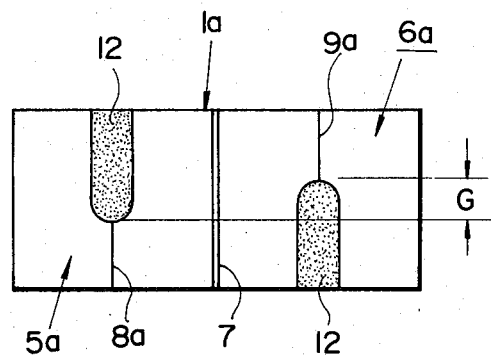
FIG. 8 is a top plan view showing another embodiment of a composite magnetic head assembly according to the present invention.

While the above embodiment has been concerned with a magnetic recording and reproducing system using a composite magnetic head assembly having a predetermined azimuth angle $\alpha$, the present invention is not limited to this particular embodiment. For example, it is possible to use a magnetic head assembly 1a, as shown in FIG. 8, in which effective gaps 9a and 8a of respective FE and R/P heads 6a and 5a have no azimuth angle and are spaced apart by a predetermined distance G. This head assembly may be used for a magnetic recording and reproducing system, in which predetermined guard bands are provided between adjacent recording tracks.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A helical scan type video tape recording apparatus having an editing function, comprising:
   a rotary body;
   a rotary video head secured to said rotary body for recording video signals on a video tape in a plurality of skewed video tracks;
   recording control means for supplying recording current to said video head in response to a recording command signal;
   a rotary erase head secured to said rotary body for erasing video signals recorded in selected video tracks, said rotary erase head being positioned to scan said video tracks ahead of said video head by at least one video tracks interval; and
   erasing control means for supplying erasing current to said rotary erase head in response to said recording command signal.

2. A helical scan type video tape recording apparatus according to claim 1, wherein said erasing control means supplies said erasing current to said rotary erase head in advance, by at least one video track interval, of the recording current supplied to said rotary video head.

3. A helical scan type video type recording apparatus according to claim 1, wherein two rotary video heads are secured to said rotary body at positions spaced apart from each other by 180 degrees; and
   two rotary erase heads are also provided on said rotary body spaced apart from each other by 180 degrees.

4. A helical scan type video tape recording apparatus according to claim 3, wherein said two rotary video heads have azimuth angles which are different from each other, and said plurality of skewed video tracks are formed without guard bands between adjacent video tracks.

5. A helical scan type video tape recording apparatus according to claim 4, wherein said rotary erase heads are positioned to scan said video tracks ahead of the respectively associated rotary video heads by more than one video track interval.

6. A helical scan type video tape recording apparatus according to claim 5, wherein the effective track width of said rotary video heads is equal to or larger than the effective track width of said rotary erase heads.

7. A helical scan type video tape recording apparatus according to claim 5, wherein each of said rotary video heads and a respective one of said rotary erase heads constitute a combination head, with two such combination heads being secured to said rotary body at positions spaced apart from each other by 180 degrees.

8. A helical scan type video tape recording apparatus according to claim 7, wherein the rotary head and video head of each said combination head have the same azimuth angle.

9. In a helical scan type video tape recording apparatus of the type adapted to perform an editing operation and having a rotary body, a first magnetic head assembly comprising:
a first video head secured to said rotary body for recording video signals on a video tape in a plurality of parallel tracks extending obliquely on the tape; and
a first erase head integrally formed with said first video head and secured to said rotary body for erasing video signals recorded in said video tracks, said erase head being positioned to scan said video tracks with the scanning position of said first erase head being always displaced ahead of the scanning position of said video head by at least one video track interval in the scanning direction of said heads.

10. A video tape recording apparatus according to claim 9; wherein said first video head has an air gap with a first azimuth angle and said first erase head has an air gap with said first azimuth angle.

11. A video tape recording apparatus according to claim 9; further including a second magnetic head assembly comprising:
a second video head secured to said rotary body for recording video signals on said video tape in a plurality of parallel tracks extending obliquely on the tape; and
a second erase head integrally formed with said second video head and secured to said rotary body for erasing video signals recorded in selected ones of said video tracks, said second erase head being positioned to scan said selected ones of said video tracks with the scanning position of said second erase head being always displaced ahead of the scanning position of said second video head by at least one video track interval in the scanning direction of said second head.

12. A video tape recording apparatus according to claim 11; wherein said second magnetic head assembly is displaced from said first magnetic head assembly on said rotary body by 180 degrees.

13. A video tape recording apparatus according to claim 11; wherein said second video head has an air gap with a second azimuth angle different from said first azimuth angle and said second erase head has an air gap with said second azimuth angle.

14. A video tape recording apparatus according to claim 11; wherein the length of the air gaps of said first and second erase heads is not greater than the length of the air gaps of said first and second video heads, respectively.

15. A video tape recording apparatus according to claim 11; wherein said first video head scans alternate tracks on said tape and said second video head scans the remaining alternate tracks on said tape.

* * * * *